W. H. GETZENDANNER & J. P. MARQUARDT, Jr.
Horse-Collar.

No. 204,664. Patented June 11, 1878

Witnesses.
Chas M Peck
P. H. Gunckel

Inventor
Wm H. Getzendanner
J. Philip Marquardt Jr.
by their Attys
Peck & Ritchie

UNITED STATES PATENT OFFICE.

WILLIAM H. GETZENDANNER AND J. PHILIP MARQUARDT, JR., OF DAYTON, OHIO.

IMPROVEMENT IN HORSE-COLLARS.

Specification forming part of Letters Patent No. 204,664, dated June 11, 1878; application filed October 29, 1877.

*To all whom it may concern:*

Be it known that we, WILLIAM H. GETZENDANNER and J. PHILIP MARQUARDT, Jr., of Dayton, in the county of Montgomery and State of Ohio, have invented certain new and useful Improvements in Horse-Collars; and we do hereby declare the following to be a full, clear, and exact description of the same.

Our invention is an improvement in the construction of collars peculiarly applicable to the harness of fire-engines, where there is great need for expedition in attaching the horses to the vehicle.

The novelty consists in the construction of the collar, whereby it can be fitted and clamped upon the horses' necks, and at the same time be rendered perfectly stiff, so as not to double back and pinch.

Figure 1:
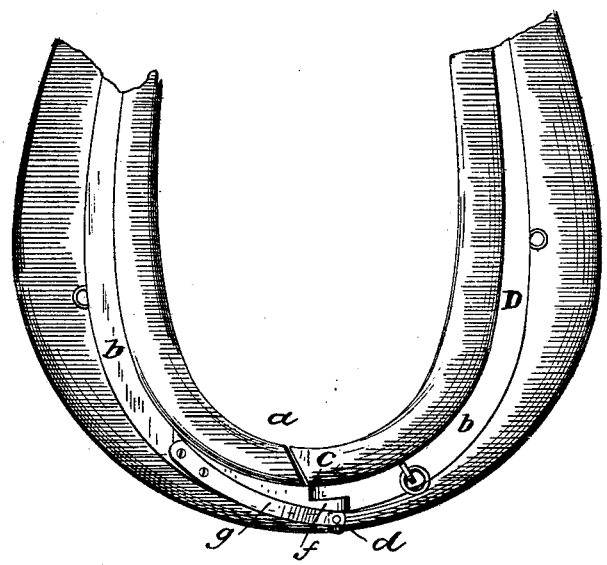
Figure 2:
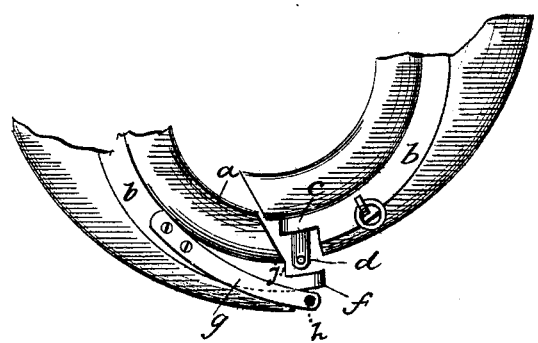

In the accompanying drawing, in illustration of our invention, Figure 1 is a front elevation of our improved collar when in a closed position; Fig. 2, a similar view of the same, showing the manner of opening or closing the same.

We take any ordinary collar, D, and cut it through diagonally at its lower end, as at $a$, and upon this collar we fit metal hames $b$, which are applied in the usual way, and differ from those in common use only at their lower ends, which we form into overlapping knuckle-joints, as shown in Fig. 2. The upper one of these overlapping pieces $c$ has projecting from it a stud or pin, $d$, which fits into the under piece $f$, being caught and held by a spring-strip, $g$, attached, as seen, to one side of the hame, and carrying at its outer end a stud, $h$, which last enters a slot in the pivot-pin $d$. By pressing out the spring $g$ the hames can be unjointed and the collar spread open, as in Fig. 2.

By means of the shoulders at $j$ the collar is prevented from doubling back and pinching the horse's neck.

This collar is especially adapted for use in harness suspended above the necks of the horses or over the engine-pole, ready to fall whenever the horses rush to their places from their stalls.

The essentially novel feature of this invention consists in cutting the collar through diagonally at its lower end, and, in connection with such diagonal cut, constructing the coupling so that in bringing the parts together a vertical pressure has to be exerted. Consequently, in order to sever the connection, a like vertical pressure would be required. This construction and arrangement will in a great measure, if not entirely, prevent the accidental dislocation of the parts, or, in other words, will prevent the collar coming open accidentally while on the horse's neck. By means of the diagonal cut the juncture of the hames can be more easily effected than if the collar should be cut through straight.

We are aware that is not new to construct collars which are hinged so as to be capable of being opened and clamped upon the horse's neck, and consequently we do not broadly claim an expanding collar provided with a fastening device.

What we claim is—

The collar D, cut through diagonally at its lower end, in combination with the metal hames, one of which is provided with a vertical pin, $d$, and the other with a socket-piece, $f$, adapted to slip over the pin, and held from displacement by the spring-latch $g$, the whole adapted to be opened or closed by vertical pressure, substantially as and for the purpose specified.

Witness our hands this 12th day of October, A. D. 1877.

WILLIAM H. GETZENDANNER.
J. PHILIP MARQUARDT, JR.

Witnesses:
CHAS. M. PECK,
WM. RITCHIE.